(12) United States Patent
Briand et al.

(10) Patent No.: US 12,236,979 B2
(45) Date of Patent: Feb. 25, 2025

(54) AUTOMATION OF MEDIA CONTENT PLAYBACK

(71) Applicant: Disney Enterprises, Inc., Burbank, CA (US)

(72) Inventors: Manuel Briand, Woodland Hills, CA (US); Yuanyi Xue, Alameda, CA (US); Nathan Crowe, Brooklyn, NY (US); Scott Labrozzi, Cary, NC (US); Michael Bracco, Raleigh, NC (US); Mugdha Oltikar, Raleigh, NC (US)

(73) Assignee: Disney Enterprises, Inc., Burbank, CA (US)

( * ) Notice: Subject to any disclaimer, the term of this patent is extended or adjusted under 35 U.S.C. 154(b) by 125 days.

(21) Appl. No.: 17/864,896

(22) Filed: Jul. 14, 2022

(65) Prior Publication Data

US 2024/0021216 A1    Jan. 18, 2024

(51) Int. Cl.
*G11B 27/00* (2006.01)
*G11B 27/34* (2006.01)

(52) U.S. Cl.
CPC ............ *G11B 27/005* (2013.01); *G11B 27/34* (2013.01)

(58) Field of Classification Search
CPC .............................. G11B 27/005; G11B 27/34
See application file for complete search history.

(56) References Cited

U.S. PATENT DOCUMENTS

2023/0362446 A1* 11/2023 Bradley ................. G06V 20/46

OTHER PUBLICATIONS

"VOD Monitor: Video Quality Assurance at Scale That Correlates with Human Vision" 2022 https://www.ssimwave.com/products/ssimplus-vodmonitor/ 20 pages.
"No more Content QC headaches: Pulsar makes it incredibly simple!" 2022 https://www.veneratech.com/pulsar-automated-file-qc/ 21 pages.
"VMAF-Video Multi-Method Assessment Fusion" 2022 https://github.com/Netflix/vmaf 4 pages.
"Pixel Tools: Experts in Video Processing. Rate Control and H.264" 2022 https://www.pixeltools.com/rate_control_paper.html 9 Pages.

(Continued)

*Primary Examiner* — Girumsew Wendmagegn
(74) *Attorney, Agent, or Firm* — Farjami & Farjami LLP (57) ABSTRACT

A system includes processing hardware and a memory storing software code. The processing hardware executes the software code to receive automation data for media content having a default playback experience, analyze, using the automation data, at least one parameter of the media content, and generate, based on the analyzing, one or more automation instruction(s) for at least one portion(s) of the media content. The automation instruction(s) include at least one of: one or more bounding timestamps of the media content portion(s), an increased or reduced playback speed for the media content portion(s) relative to the default playback experience, or a variable playback speed for the media content portion(s). The software code is further executed to outputs the automation instruction(s) to a media delivery platform configured to distribute and control the quality of the media content or to a media player configured to automate playback of the media content.

16 Claims, 7 Drawing Sheets

(56) References Cited

OTHER PUBLICATIONS

"Series P: Telephone Transmission Quality, Telephone Installations, Local Line Networks: Models and tools for quality assessment of streamed media" International Telecommunications Union Jan. 2020 https://www.itu.int/rec/T-REC-P.1204 22 Pages.
Matteo Torcoli, Thornsten Kastner, and Jurgen Herre "Objective Measures of Perceptual Audio Quality Reviewed: An Evaluation of Their Application Domain Dependence." IEEE/ACM Transactions on Audio, Speech, and Language Processing, vol. 29, 2021 https://arxiv.org/pdf/2110.11438.pdf 12 Pages.
Omer F. Aladag, Deniz Ugur, Mehmet N. Akcay, Ali C. Begen "Content-Aware Playback Speed Control for Low-Latency Live Streaming of Sports" MMSys '21: Proceedings of the 12th ACM Multimedia Systems Conference Sep. 22, 2021 4 Pages.
Deniz Uger "Content-Aware Playback Speed for Low-Latency Live Streaming of Sports" Jul. 18, 2021 4 Pages https://github.com/DenizUgur/CAPSC.
http://streaming university/demo/mmsys21-capsc/ 2021 1 Page.

* cited by examiner

AUTOMATION OF MEDIA CONTENT PLAYBACK

BACKGROUND

Due to its nearly universal popularity as a content medium, ever more audio-video (AV) content is being produced and made available to consumers. As a result, the efficiency with which audio and video content can be analyzed and assessed has become increasingly important to the producers, owners, and distributors of that media content.

Analysis of media content is typically performed manually. For example, the analysis of the video quality, audio quality, or both, of AV content is typically performed by human quality control (QC) technicians. Although performing a full end-to-end review of media content provides the most reliable QC results, that process is typically undesirably time consuming and may require the participation of multiple QC technicians in order to be completed in a timely manner. As a result, the efficiency of QC review could be considerably enhanced by greater use of spot-checks and less reliance on complete end-to-end reviews.

However, there is considerable risk associated with spot-checks because some features of a media content asset that fail to meet quality standards may not be identified if their associated timestamps are not aligned with predetermined spot-check intervals. For example, if a defect in media content occurs at timestamp twenty minutes (00:20:00) of a media content asset, but QC spot-checks are performed at intervals 00:15:00-00:16:00 and 00:30:00-00:31:00, i.e., before and after the defect is detectable, the opportunity to identify and correct the defect would be missed. Consequently, there is a need in the art for automated systems and methods for analyzing media content that enable a substantial reduction in the manually processing of such content, while maintaining content quality.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for enabling automation of media content playback. It is noted that although the present adaptive processing solution is described below in detail by reference to the specific and merely exemplary use case in which quality control (QC) processes are rendered adaptive to specific features of the audio-video (AV) content to which they are applied, the present novel and inventive principles may be advantageously applied to video unaccompanied by audio, to audio content unaccompanied by video, as well as to one or more of audio or video content in combination with text, content metadata, or both text and content metadata. In addition, or alternatively, in some implementations, the type of content to which the present novel and inventive principles are applicable may be or include digital representations of persons, fictional characters, locations, objects, and identifiers such as brands and logos, for example, which populate a virtual reality (VR), augmented reality (AR), or mixed reality (MR) environment. Moreover, that content may depict virtual worlds that can be experienced by any number of users synchronously and persistently, while providing continuity of data such as personal identity, user history, entitlements, possessions, payments, and the like. It is noted that the media content playback automation solution disclosed by the present application may also be applied to content that is a hybrid of traditional audio-video and fully immersive VR/AR/MR experiences, such as interactive video.

Furthermore, in addition to the exemplary use case of QC review of media content, the present novel and inventive concepts may readily be adapted to other applications. Examples of those other applications may include adaptive playback of entertainment content by a media player, adaptive buffering of media content by a media player to minimize re-buffering of high bit rate media content, adaptive streaming of media content by a media delivery platform, and review of media content for compliance with intellectual property licensing, to name a few. As a specific example, the present adaptive processing solution enables automating adaptive playback of media content based on content of interest from an end-user perspective, such as adaptive playback of video highlights where highlights may be defined as content of interest identified by selection inputs received from the end-user, or from another user who previously consumed the same content and recommended a specific portion of the content. For example, user A may watch a particular movie and may recommend certain scenes from the movie for user B to watch later, or even at the same time if both users A and B are participating in a networked "watch party."

In addition, or alternatively, such content of interest may be identified by external entities such as media content production studios or other sources of media content. As another specific example, a broadcaster or other media content source may provide sporting event "highlights" data that could be used to create an adaptive user experience by reducing playback speed for important events during the competition (e.g., touchdowns, goals, red cards, homeruns, and the like) and increase playback speed during routine play. Moreover, in various implementations, the systems and methods disclosed by the present application may advantageously be substantially or fully automated.

As used in the present application, the terms "automation," "automated," and "automating" refer to systems and processes that do not require the participation of a human editor or analyst. Although, in some implementations, a human editor or analyst may sample or otherwise review the instructions for adaptively processing media content identified by the automated systems and according to the automated methods described herein, that human involvement is optional. Thus, the methods described in the present application may be performed under the control of hardware processing components of the disclosed automated systems.

It is noted that, as defined in the present application, the expression "playback experience" may refer to the full suite of features utilized during media content playback. By way of example, a playback experience can encompass such features as playback speed, audio volume, spoken language, the use or omission of subtitles or other captioning, and so forth. Thus, the expression "default playback experience" refers to the predetermined default setting for such playback features.

Figure 1:
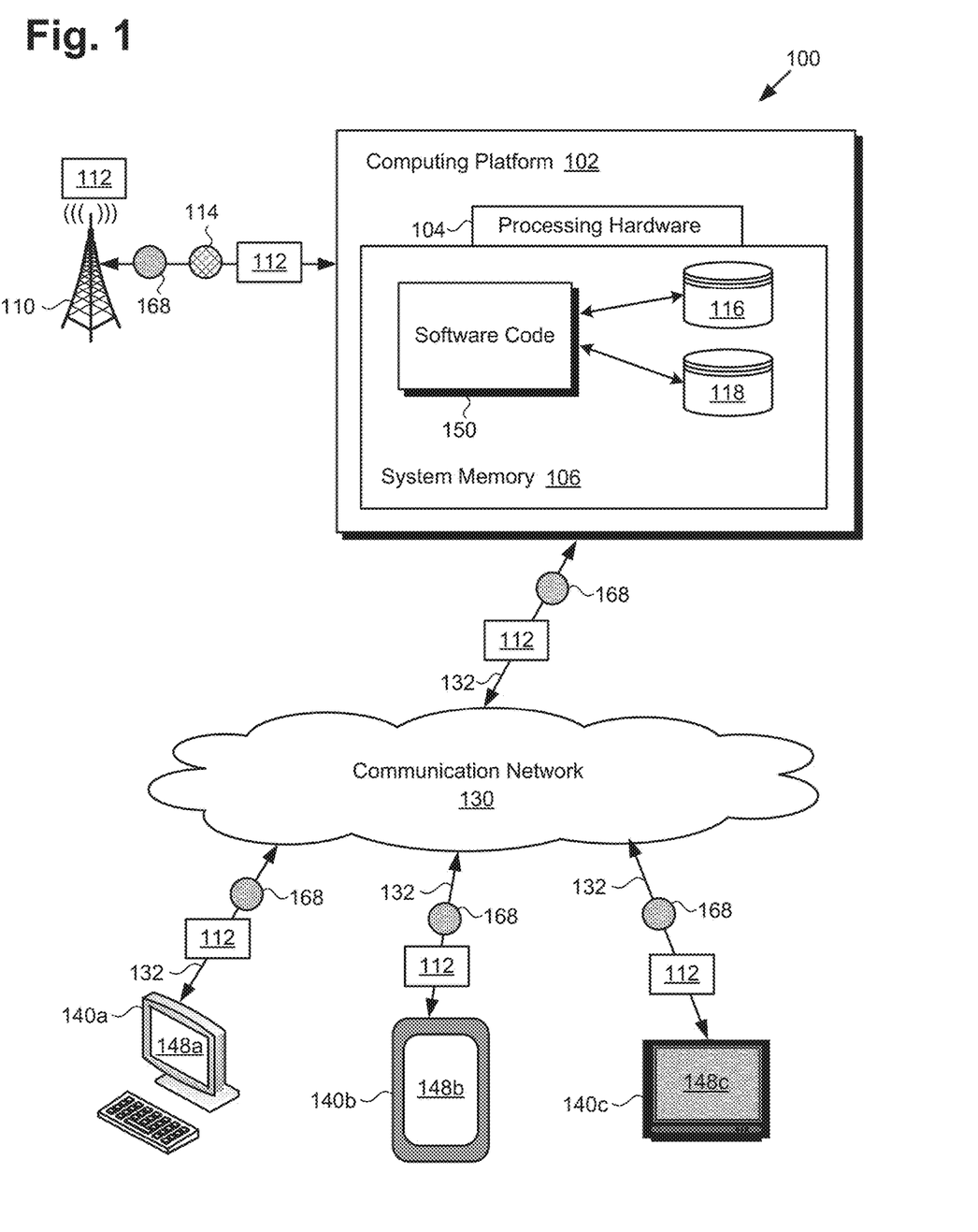
FIG. 1 shows a diagram of an exemplary system for enabling automation of media content playback, according to one implementation.

FIG. 1 shows exemplary system 100 for enabling automation of media content playback, according to one implementation. As shown in FIG. 1, system 100 includes computing platform 102 having processing hardware 104 and system memory 106 implemented as a computer-readable non-transitory storage medium. According to the present exemplary implementation, system memory 106 stores software code 150, automation instructions database 116, and content of interest database 118.

As further shown in FIG. 1, system 100 is implemented within a use environment including media content source 110 providing automation data 114 for media content 112 to system 100 and receiving one or more automation instructions 168 for media content 112 (hereinafter "automation instruction(s) 168") from system 100.

As depicted in FIG. 1, in some use cases, media content source 110 may find it advantageous or desirable to make media content 112 and automation instruction(s) 168 for media content 112 available via an alternative distribution mode, such as communication network 130, which may take the form of a packet-switched network, for example, such as the Internet. For instance, system 100 may be utilized by media content source 110 to distribute media content 112 and automation instruction(s) 168 for media content 112 as part of a content stream, which may be an Internet Protocol (IP) content stream provided by a streaming service, or a video-on-demand (VOD) service, for example.

The use environment of system 100 also includes user systems 140a, 140b, and 140c (hereinafter "user systems 140a-140c") receiving media content 112 and automation instruction(s) 168 for media content 112 from system 100 via communication network 130. With respect to user systems 140a-140c, it is noted that although FIG. 1 depicts three user systems, that representation is merely by way of example. In other implementations, user systems 140a-140c may include as few as one user system, or more than three user systems. Also shown in FIG. 1 are network communication links 132 of communication network 130 interactively connecting system 100 with user systems 140a-140c, as well as displays 148a, 148b, and 148c (hereinafter "displays 148a-148c") of respective user systems 140a-140c.

Although the present application refers to software code 150, automation instructions database 116, and content of interest database 118 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to processing hardware 104 of computing platform 102 or to respective processing hardware of user systems 140a-140c (processing hardware of user systems 140a-140c not shown in FIG. 1). Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs such as DVDs, RAM, programmable read-only memory (PROM), erasable PROM (EPROM), and FLASH memory.

Moreover, although FIG. 1 depicts software code 150, automation instructions database 116, and content of interest database 118 as being co-located in system memory 106, that representation is also provided merely as an aid to conceptual clarity. More generally, system 100 may include one or more computing platforms 102, such as computer servers for example, which may be co-located, or may form an interactively linked but distributed system, such as a cloud-based system, for instance. As a result, processing hardware 104 and system memory 106 may correspond to distributed processor and memory resources within system 100. Consequently, in some implementations, one or more of software code 150, automation instructions database 116, and content of interest database 118 may be stored remotely from one another on the distributed memory resources of system 100.

Processing hardware 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 150, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) processes such as machine learning.

It is also noted that, as defined in the present application, the expression "machine learning" or "machine learning model" may refer to a mathematical model for making future predictions based on patterns learned from samples of data or "training data." For example, machine learning models may be trained to perform image processing, natural language processing (NLP), and other inferential processing tasks. Various learning algorithms can be used to map correlations between input data and output data. These correlations form the mathematical model that can be used to make future predictions on new input data. Such a predictive model may include one or more logistic regression models, Bayesian models, or artificial neural networks (NNs). A "deep neural network," in the context of deep learning, may refer to an NN that utilizes multiple hidden layers between input and output layers, which may allow for learning based on features not explicitly defined in raw data. As used in the present application, a feature identified as an NN refers to a deep neural network.

In some implementations, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. Furthermore, in some implementations, system 100 may be implemented virtually, such as in a data center. For example, in some implementations, system 100 may be implemented in software, or as virtual machines.

It is further noted that, although user systems 140a-140c are shown variously as desktop computer 140a, smartphone 140b, and smart television (smart TV) 140c, in FIG. 1, those representations are provided merely by way of example. In other implementations, user systems 140a-140c may take the form of any suitable mobile or stationary computing devices or systems that implement data processing capabilities sufficient to provide a user interface, support connections to communication network 130, provide a media player configured to automate playback of media content 112, and implement the functionality ascribed to user systems 140a-140c herein. That is to say, in other implementations, one or more of user systems 140a-140c may take the form of a laptop computer, tablet computer, digital media player, game console, or a wearable communication device such as a smartwatch, augmented reality (AR) viewer, or virtual reality (VR) headset, to name a few examples. It is also noted that displays 148a-148c may take the form of liquid crystal displays (LCDs), light-emitting diode (LED) displays, organic light-emitting diode (OLED) displays, quantum dot (QD) displays, or any other suitable display screens that perform a physical transformation of signals to light.

In some implementations, media content source 110 may be a media entity providing media content 112. Media content 112 may include content from a linear TV program stream, for example, that includes a high-definition (HD) or ultra-HD (UHD) baseband video signal with embedded audio, captions, time code, and other ancillary content metadata, such as ratings and/or parental guidelines. In some implementations, media content 112 may also include multiple audio tracks, and may utilize secondary audio programming (SAP) and/or Descriptive Video Service (DVS), for example. Alternatively, in some implementations, media content 112 may be video game content. As yet another alternative, and as noted above, in some implementations media content 112 may be or include digital representations of persons, fictional characters, locations, objects, and identifiers such as brands and logos, for example, which populate a VR, AR, or MR environment. Moreover, media content 112 may depict virtual worlds that can be experienced by any number of users synchronously and persistently, while providing continuity of data such as personal identity, user history, entitlements, possessions, payments, and the like. As also noted above, media content 112 may be or include content that is a hybrid of traditional audio-video and fully immersive VR/AR/MR experiences, such as interactive video.

In some implementations, media content 112 may be the same source video that is broadcast to a traditional TV audience. Thus, media content source 110 may take the form of a conventional cable and/or satellite TV network, for example. As noted above, media content source 110 may find it advantageous or desirable to make media content 112 and automation instruction(s) 168 for media content 112 available via an alternative distribution mode, such as communication network 130, which may take the form of a packet-switched network, for example, such as the Internet, as also noted above. Alternatively, or in addition, although not depicted in FIG. 1, in some use cases media content 112 and automation instruction(s) 168 for media content 112 may be distributed on a physical medium, such as a DVD. Blu-ray Disc®, or FLASH drive, for example.

Figure 2:
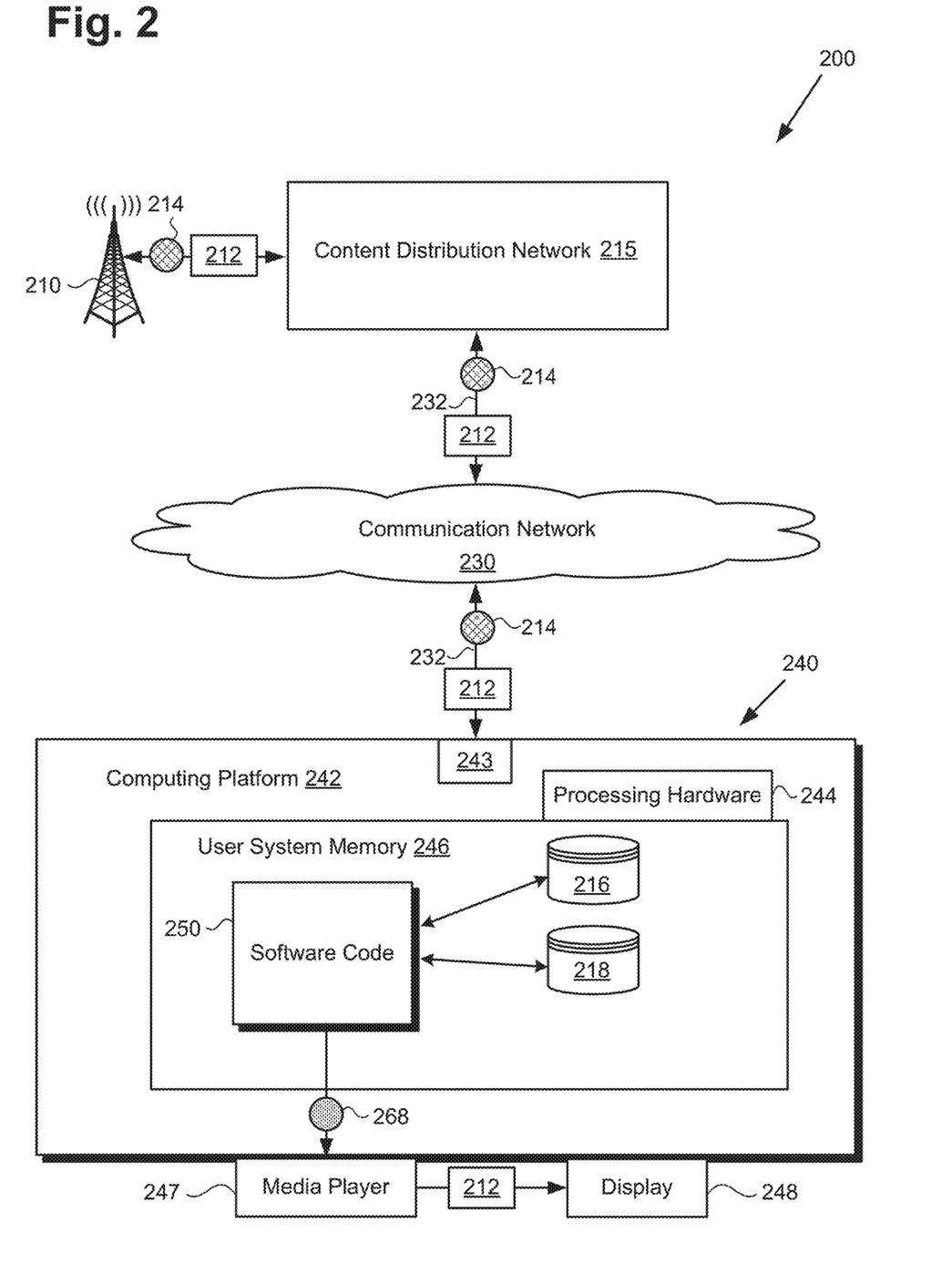
FIG. 2 shows a diagram of another exemplary implementation of a system for enabling automation of media content playback.

FIG. 2 shows another exemplary system, i.e., user system 240, for enabling automation of media content playback, according to one implementation. As shown in FIG. 2, user system 240 includes computing platform 242 having transceiver 243, processing hardware 244, user system memory 246 implemented as a computer-readable non-transitory storage medium, media player 247, and display 248. According to the present exemplary implementation, system memory 206 stores software code 250, automation instructions database 216, and content of interest database 218. With respect to display 248, it is noted that, in various implementations, display 248 may be physically integrated with user system 240 or may be communicatively coupled to but physically separate from user system 240. For example, where user system 240 is implemented as a smart TV, smartphone, laptop computer, tablet computer, AR viewer, or VR headset, display 248 will typically be integrated with user system 240. By contrast, where user system 240 is implemented as a desktop computer, display 248 may take the form of a monitor separate from computing platform 242 in the form of a computer tower.

As also shown in FIG. 2, user system 240 is utilized in use environment 200 including media content source 210 providing media content 212 and automation data 214 for media content 212 to content distribution network 215, which in turn distributes media content 212 and automation data 214 for media content 212 to user system 240 via communication network 230 and network communication links 232. According to the implementation shown in FIG. 2, software code 250 stored in user system memory 246 of user system 240 is configured to receive media content 212 and automation data 214 for media content 212 and to generate one or more automation instructions 268 for media content 212 (hereinafter "automation instruction(s) 268") for media content 212, using automation data 214 for media content 212.

Media content source 210, media content 212, automation data 214 for media content 212, automation instruction(s) 268, communication network 230, and network communication links 232 correspond respectively in general to media content source 110, media content 112, automation data 114 for media content 112, automation instruction(s) 168, communication network 130, and network communication links 132, in FIG. 1. In other words, media content source 210, media content 212, automation data 214 for media content 212, automation instruction(s) 268, communication network 230, and network communication links 232 may share any of the characteristics attributed to respective media content source 110, media content 112, automation data 114 for media content 112, automation instruction(s) 168, communication network 130, and network communication links 132 by the present disclosure, and vice versa.

User system 240 and display 248 correspond respectively in general to any or all of user systems 140a-140c and respective displays 148a-148c in FIG. 1. Thus, user systems 140a-140c and displays 148a-148c may share any of the characteristics attributed to respective user system 240 and display 248 by the present disclosure, and vice versa. That is to say, like displays 148a-148c, display 248 may take the form of an LCD, LED display, OLED display, or QD display, for example. Moreover, although not shown in FIG. 1, each of user systems 140a-140c may include features corresponding respectively to computing platform 242, transceiver 243, media player 247, processing hardware 244, and user system memory 246 storing software code 250 automation instructions database 216, and content of interest database 218.

Transceiver 243 may be implemented as a wireless communication unit configured for use with one or more of a variety of wireless communication protocols. For example, transceiver 243 may be implemented as a fourth generation (4G) wireless transceiver, or as a 5G wireless transceiver. In addition, or alternatively, transceiver 243 may be configured for communications using one or more of WiFi. Bluetooth, Bluetooth LE. ZigBee, and 60 GHz wireless communications methods.

User system processing hardware 244 may include multiple hardware processing units, such as one or more CPUs, one or more GPUs, one or more TPUs, and one or more FPGAs, for example, as those features are defined above.

Figure 3:
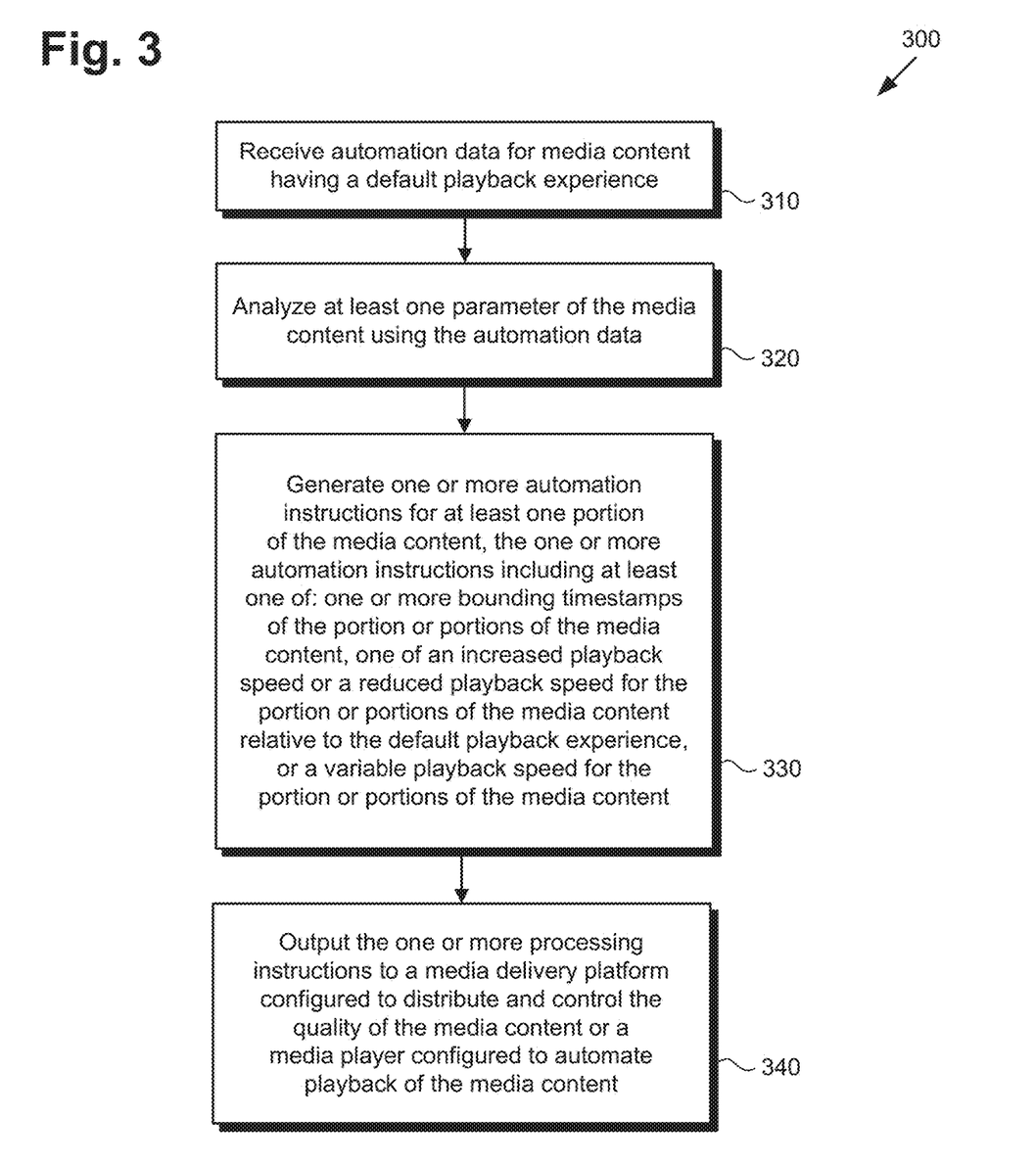
FIG. 3 shows a flowchart outlining an exemplary method for enabling automation of media content playback, according to one implementation.

Software code 250, automation instructions database 216, and content of interest database 218 correspond respectively in general to software code 150, automation instructions database 116, and content of interest database 118, in FIG. 1. Thus, software code 250, automation instructions database 216, and content of interest database 218, may share any of the characteristics attributed to respective software code 150, automation instructions database 116, and content of interest database 118 by the present disclosure, and vice versa. In other words, like software code 150, software code 250 may include one or more machine learning models. Moreover, in implementations in which client processing hardware 244 executes software code 250 stored locally in user system memory 246, user system 240 may perform any The functionality of system 100, user system(s) 140a-140c/240, and software code 150/250 shown variously in FIGS. 1 and 2 will be further described by reference to FIG. 3. FIG. 3 shows flowchart 300 presenting an exemplary method for enabling automation of media content playback, according to one implementation. With respect to the method outlined in FIG. 3, it is noted that certain details and features have been left out of flowchart 300 in order not to obscure the discussion of the inventive features in the present application.

Referring to FIG. 3 in combination with FIGS. 1 and 2, flowchart 300 begins with receiving automation data 114/214 for media content 112/212 having a default playback experience (action 310). As noted above, media content 112/212 may include content in the form of video games, music videos, animation, movies, or episodic TV content that includes episodes of TV shows that are broadcasted, streamed, or otherwise available for download or purchase on the Internet or via a user application. Alternatively, or in addition, and as noted above, in some implementations media content 112/212 may be or include digital representations of persons, fictional characters, locations, objects, and identifiers such as brands and logos, for example, which populate a VR. AR, or MR environment. Moreover, media content 112/212 may depict virtual worlds that can be experienced by any number of users synchronously and persistently, while providing continuity of data such as personal identity, user history, entitlements, possessions, payments, and the like. As also noted above, media content 112/212 may be or include content that is a hybrid of traditional audio-video and fully immersive VR/AR/MR experiences, such as interactive video.

Automation data 114/214 for media content 112/212 may include one or more of a variety of objective media quality (MQ) metrics, encoding parameters, or objective MQ metrics and encoding parameters. In use cases in which media content 112/212 includes video content, for instance, automation data 114/214 may include one or more of the following objective video quality (VQ) metrics for all encoded frames: Frame Quantization Parameter (QP), Constant Rate Factor (CRF), Video Buffer Verifier (VBV). Peak Signal-to-Noise Ratio (PSNR), Video Multimethod Assessment Fusion (VMAF). Contrast Aware Multiscale Banding Index (CAMBI), ITU-T Recommendation P.1204 "bitstream-based no reference model," SSIMWAVE Encoder Performance Score (EPS), Perceptual Evaluation of Audio Quality (PEAQ), Perceptual Objective Listening Quality Assessment (POLQA), and Virtual Speech Quality Objective Listener for Audio (ViSQOLAudio), to name some examples. When media content 112/212 includes audio content or AV content, for instance, automation data 114/214 may include or further include one or more audio quality (AQ) metrics, such as Perceptual Evaluation of Audio Quality (PEAQ), for instance. In some cases, the MQ metrics may include parameters that indicate areas that should be targeted for different playback based on the areas being sensitive areas for review for reasons other than a measurement of a specific video or audio quality of the video (for example, ad markers or localization markers).

In some use cases, media content 112/212 may include text, such as subtitles or other captioning for example, content metadata, or both text and content metadata. For example, media content 112/212 may include text or content metadata identifying media content 112/212 as standard-value content, high-value content, or high-profile content. In use cases in which media content 112/212 includes text, content metadata, or both, automation data 114/214 may further include those additional features.

As shown in FIG. 1, in some implementations, automation data 114 for media content 112 may be received by system 100 from media content source 110. In those implementations, automation data 114 may be received by software code 150, executed by processing hardware 104 of computing platform 102. As shown in FIG. 2, in other implementations, automation data 214 for media content 212 may be received by user system 240 from content distribution network 215 via communication network 230 and network communication links 232. Referring to FIG. 2, in those implementations, automation data 214 may be received by software code 250, executed by processing hardware 244 of user system computing platform 242.

Flowchart 300 further includes analyzing, using automation data 114/214, at least one parameter of media content 112/212 (action 320). For example, processing hardware 104/244 may execute software code 150/250 to use one or more of the objective MQ metrics or encoding parameters identified above to compute a media quality sensitivity (MQS) map for each encoded frame, where MQS per frame may be a function of QP, CRF, PSNR. VMAF, CAMBI, and one or more additional MQ metrics, depending on the specific use case. It is noted that, in some implementations, the MQS designation for any portion of content may be expressed as an integer value from zero (0) to four (4) where MQS of 0 indicates the portion of content is not MQ sensitive, MQS of 1 indicates the portion of content is likely not MQ sensitive, MQS of 2 indicates the portion of content is slightly MQ sensitive, MQS of 3 indicates the portion of content is likely MQ sensitive, and MQS of 4 indicates the portion of content is highly MQ sensitive.

Based on one or more of the objective MQ metrics or encoding parameters identified above, portions of content including groups of frames or scenes with a single degree of MQ sensitivity can be defined, such that a new scene boundary is identified at each MQS "spike-down" or "spike-up" across the MQS map, for example. It is noted that the MQS levels can be defined using a multi-metric rationale, for example combining frames or segments that are associated with low VMAF, medium PSNR, or both, low VMAF, low EPS, or both, or low VMAF, medium PSNR, and low EPS, and so forth.

Alternatively the frame or scene MQS levels may be determined according to percentile thresholds applied to each metric as opposed to using absolute thresholds that tend to be content dependent. For example, all the frames that have an EPS score that is under the 10% percentile threshold or a PSNR value that is under the 5% percentile threshold may have a MQS range of 2, 3, or 4, while frames that have an EPS score that is under the 2% percentile threshold or a PSNR value that is under the 1% percentile threshold may have a MQS equal to 4.

It is noted that the present novel and inventive concepts are not tied to any specific MQ metric. To the contrary, the present concepts may rely on all relevant MQ metrics per type of media content. For example the set of metrics and parameters, once combined, that will provide a wide distribution of MQS for Standard Dynamic Range (SDR) content encoded with High-Efficiency Video Coding (HEVC) may omit PSNR but include QP with EPS, while an acceptable distribution of MQS for High Dynamic Range (HDR) content encoded with HEVC may include QP and a Banding metric, such as CAMBI, in addition to EPS and PSNR.

As yet another alternative, or in addition, portions of content 112/212 that are of particular interest may be defined by other entities such as media content source 110/210, which may provide bounding timestamps and content metadata in the form of an XML file, for example.

In some use cases, media content 112/212 may include content in multiple modes, such as a first media mode in the form of a video mode and a second media mode in the form of an audio mode, or a first media mode in the form of a standard dynamic range SDR version of AV content included in media content 112/212 and a second media mode in the form of a high dynamic range HDR version of the AV content included in media content 112/212, for example. In those use cases, action 320 may include analyzing one or more first parameters corresponding to the first media mode, e.g., one or more video parameters or SDR content parameters such as QP and EPS, and analyzing one or more second parameters corresponding to the second media mode, e.g., one or more audio parameters or HDR content parameters such as QP, EPS, PSNR, and CAMBI, as described above. Moreover, in some such implementations, the analysis of the one or more first parameters may be performed in parallel with, i.e., contemporaneously with, the analysis of the one or more second parameters.

The analyzing of one or more parameters, in action 320, may be performed by software code 150, executed by processing hardware 104 of computing platform 102, or by software code 250, executed by processing hardware 244 of user system computing platform 242.

Flowchart 300 further includes generating, based on the analyzing of one or more parameters performed in action 320, automation instruction(s) 168/268 for at least one portion of media content 112/212, where automation instruction(s) 168/268 include at least one of: one or more bounding timestamps of the at least one portion of media content 112/212, one of an increased playback speed or a reduced playback speed for the at least one portion of media content 112/212 relative to the default playback experience, or a variable playback speed for the at least one portion of media content 112/212 (action 330).

As noted above, in some use cases, media content 112/212 may include content in multiple modes, such as a first media mode in the form of a video mode and a second media mode in the form of an audio mode, or a first media mode in the form of a SDR version of AV content included in media content 112/212 and a second media mode in the form of a HDR version of AV content included in media content 112/212, for example. In those use cases, and as also noted above, action 320 may include analyzing one or more first parameters corresponding to the first media mode. e.g., one or more video parameters or SDR content parameters, and analyzing one or more second parameters corresponding to the second media mode, e.g., one or more audio parameters or HDR content parameters. Moreover, in some implementations, action 320 may also include selecting those relevant parameters and combining them using variable filtering per selected parameter.

In addition, in those use cases, action 330 may include generating automation instruction(s) 168/268 for the at least one portion of media content 112/212 based on at least one of analyzing the rust parameter or analyzing the second parameter. That is to say where a first media mode of media content 112/212 is a video mode and the second media mode of media content 112/212 is an audio mode, generating automation instruction(s) 168/268 for the at least one portion of media content 112/212 in action 330 may use one or more video parameters but no audio parameters, one or more audio parameters but no video parameters, or one or more video parameters and one or more audio parameters. Analogously, where the first media mode is a SDR version of media content 112/212 and the second media mode is a HDR version of media content 112/212, generating automation instruction(s) 168/268 for the at least one portion of media content 112/212 in action 330 may use one or more SDR parameters but no HDR parameters, one or more HDR parameters but no SDR parameters, or one or more SDR parameters and one or more HDR parameters.

Automation instruction(s) 168/268 generated in action 330 may be generated based in part on the MQS on different portions of media content 112/212. For example, when an MQS of 3 or 4 is detected for frames, shots, scenes, or other segments of media content 112/212, as described above, or where such a segment is identified as a content of interest based on inputs from content source 110/210 or a user of one of user system(s) 140a-140c/240, the system may generate an automation instruction that, when received by a video player, will cause the player to play back the segment at a different playback speed relative to the default playback experience of media content 112/212 (for example, a slower playback speed to facilitate a person's careful quality review of the segment). Examples of reduced playback speeds may include one or more of 0.125×, 0.25×, 0.5×, or 0.75×, to name a few, where "X" is the playback speed included as part of the default playback experience of media content 112/212. A generated automation instruction could also be an instruction for a faster playback speed than the default playback speed (e.g., if the MQS indicates a segment that needs less review attention). Furthermore, the automation instruction could be an instruction to playback the video at a speed that is typical for a viewer playback where the default playback speed is an accelerated speed. This could be used, for example, to provide a replay of a sporting event where the default playback speed appears to a viewer as a "fast-forward" speed through the segments of the event with very little action, while the segments identified as having a high amount of action or an important game event are instructed to be played back at a normal viewing speed.

Conversely, frames, shots, scenes, or other segments of media content 112/212 having an MQS of 1 or 2, as described above, or not identified as a content of interest based on inputs from content source 110/210 or a user of one of user system(s) 140a-140c/240, may be played back at an increased playback speed relative to the default playback speed of media content 112/212. Examples of increased playback speeds may include on or more of 1.25×, 1.5×, 1.75×, 2×, or more, such as IOX, where "X" is again the default playback speed of media content 112/212.

As a specific and non-limiting example in which the present adaptive processing solution is applied to QC evaluation of a multi-variant Adaptive Bit-Rate (ABR) stack of video content, the scene-based VQS score per variant of the ABR stack can be used to define or extract a set of automation metadata values useful for the QC streaming experience. Such automation metadata for use in video QC of an ABR stack of variants may include Playback Speed Factors (PSFs) per variant of the multi-variant ABR stack, Playback Speed Rate (PSR) applicable to all variants of the ABR stack, and Count of VQ-sensitive Variants in the multi-variant ABR stack (CVV), for example.

The PSFs can be directly derived from the VQS scores for each scene. That is to say, scenes of a particular variant of media content 112/212 identified as high-profile content having the highest VQS score, e.g., 4, may be assigned the lowest possible PSF, such as 0.125× for example, to ensure thorough QC review. By contrast, scenes of a particular variant of media content 112/212 identified as standard-value and having the lowest VQS score, e.g., 0, may be assigned the highest possible PSF, such as 2×-10× for example, to maximize the efficiency of QC review, and so forth.

The PSR may apply equally to all variants of the ABR stack, and may be determined as a function of the PSFs. That is to say, where the ABR stack includes an integer number "n" of variants, PSR=function ($PSF_1, PSF_2, \ldots PSF_n$), where such a function may be minimum ($PSF_1, PSF_2, \ldots, PSF_n$), maximum ($PSF_1, PSF_2, \ldots, PSF_n$), or average ($PSF_1, PSF_2, \ldots, PSF_n$), to name a few examples. The CVV in the ABR stack can be defined for each scene as the number of variants with a VQS above a predefined threshold, e.g., VQS≥2. VQS≥3, or VQS=4.

Multi-variant PSFs or the single PSR may be selected based on the skills of the QC technician and even more importantly as a function of the ability of the QC video player to handle rapid changes in playback speed across scenes and variants. In addition, or alternatively, in some use cases PSFs may be dependent on the placement of advertising or other interstitial content included in media content 112/212. For example, where a portion of media content 112/212 is identified as advertising, that portion may by assigned a high PSF, such as 2× or 10×, for example, but the PSFs for the transitions between the advertisement and a preceding and succeeding portion of media content may be automatically reduced to allow for detection of artifacts or other video or audio defects during those transitions.

In some cases, automation instruction(s) 168/268 may include one or more instructions for playback of the at least one portion of the media content during a quality control (QC) review of media content 112/212. Moreover, in some such QC use cases, automation instruction(s) 168/268 may include generation of at least one subtitle providing a QC review prompt, such as one alerting a QC technician to the possible presence of banding, or static, for instance. Specific examples of such subtitles may include video quality flags such as "PSNR under 10% percentile" or "EPS under 80 absolute threshold." encoding flags such as "High QP above 90% percentile" or "Peak instantaneous bit rate above average bit rate by more than 2×." In addition, or alternatively, such subtitles may include guidance such as "Short Scene less than a minute." "Scene with low luminance." "scene with high color shift at hh:mm:ss timestamp,", and "Review Top 3 variants required for this scene" as opposed to Top 1st variant review by default, and so forth.

It is noted that generation of automation instruction(s) 168/268 in action 330 may be context sensitive. That is to say, the specific content within a frame or frames of media content 112/212 may modify how or even whether a potential defect in media content 112/212 is flagged for review. For example, it can be the case that what appears to be a defect in one media domain may not actually be contextually a defect when one considers other media domains. One example is audio static, which may indicate a defect requiring correction, but may simply be an appropriate audio effect accompanying one or more video frames showing a static screen of TV. Another example includes apparent typographical errors (typos) in subtitles. In some instances those apparent typos may be defects, while in others they may appropriately signal a stutter or slurred speech by a performer. A QC process that does not attempt to bring sufficient context is subject to false positive identification of defects in media content. Thus, in some implementations, action 330 includes interpreting potential defects in light of context in order to generate automation instruction(s) 168/268. Generation of automation instruction(s) 168/268 in action 330 may be performed by software code 150, executed by processing hardware 104 of computing platform 102, or by software code 250, executed by processing hardware 244 of user system computing platform 242.

In some implementations, contextual information in the form of comparative MQS scores may be used to override automation instructions arising from a particular media mode. For instance, in the example of detection of audio static alluded to above, where that audio static is located within a scene having low VQS score, e.g., 0 or 1, and also a low Audio Quality Sensitivity (AQS) score. e.g., also 0 or 1, the potential defect may be ignored and automation instructions may specify that the portion of media content 112/212 including the detected audio static be played back during QC at a playback speed of greater than 1× despite the possible audio defect. Alternatively, where audio is muted during QC playback of video, the audio may automatically be activated at the timestamp of the detected audio static to enable a QC technician to make a determination as to whether the sound of static is a defect relative to the context provided by the video. Analogously, audio could be temporarily enabled at a timestamp of media content 112/212 corresponding to an apparent subtitle typo to verify whether a stutter or slurred speech is appropriate to the context of media content 112/212 at that point.

Alternatively, or in addition, subtitles for the deaf and hard of hearing (SDH) included in media content 112/212 may be used to provide additional contextual information for reducing false positive identification of defects in media content 112/212. For example, SDH may enable identification of frames, segments, or scenes having high AQS, VQS, or both, that nevertheless do not require intensive scrutiny during QC review. For example, an audio quality score may indicate that static noise is present in the audio track, which would ordinarily represent a defect, but the presence of a subtitle indicating "[static]" would indicate that the static noise is intentionally placed in the video. As another example, an AQS score may indicate that the volume of dialog in a portion of a scene is particularly low, but a subtitle stating "[inaudible]" may indicate that the volume is supposed to be too low to clearly hear at that point.

Flowchart 300 further includes outputting automation instruction(s) 168/268 to one of a media delivery platform configured to distribute and control the quality of media content 112/212, such as media content source 110/210 or content distribution platform 215 for example, or media player 247 configured to automate playback of media content 112/212 (action 340). Action 340 may be performed by software code 150, executed by processing hardware 104 of computing platform 102, or by software code 250, executed by processing hardware 244 of user system computing platform 242.

As discussed above, in addition to the exemplary use case of QC review of media content, the present novel and inventive concepts may readily be adapted to other applications. Thus, in various exemplary use cases automation instruction(s) 168/268 may be output to media player 247 to enable adaptive playback of entertainment content, adaptive buffering of media content 112/212 to minimize re-buffering of high bit rate content, or both. In addition, or alternatively, automation instruction(s) 168/268 may be output to media content source 110/210 or content distribution platform 215 to enable adaptive streaming or other transmission of media content 112/212 by those media delivery platforms. That is to say, in some use cases, automation instruction(s) 168/268 may include one or more instructions for transmission of the at least one portion of media content 112/212 to media player 247 configured to automate playback of media content 112/212, and automation instruction(s) 168/268 are output to media content source 110/210 or content distribution platform 215 configured to distribute and control the quality of media content 112/212.

In some use cases in which media content 112/212 takes the form of entertainment content including a first media mode as a video mode and a second media mode as an audio mode, processing hardware 104 may execute software code 150, processing hardware 244 may execute software code 250, to receive, from a user of media player 247, one or more selection inputs. Those one or more selection inputs may then be used by software code 150 executed by processing hardware 104, or by software code 250 executed by processing hardware 244, to determine one or more video parameters, one or more audio parameters, or one or more video parameters and one or more audio parameters for analyzing automation data 114/214 in action 320. In those use cases, automation instruction(s) 168/268 are output to media player 247 configured to automate playback of media content 112/212.

As a specific example, the present adaptive processing solution enables automating adaptive playback of media content 112/212, such as adaptive playback of video highlights where highlights may be defined as content of interest identified by selection inputs received from a user of one of user system(s) 140a-140c/240, for example. As another specific example, a broadcaster or other media content source may provide sporting event "highlights" data that could be used to create an adaptive user experience by reducing playback speed for important events during the competition (e.g., touchdowns, goals, red cards, homeruns, and the like) and increase playback speed during routine play.

With respect to the method outlined by flowchart 300, it is noted that, in some implementations, actions 310, 320, 330, and 340 may be performed in an automated process from which human participation may be omitted.

Figure 4A:
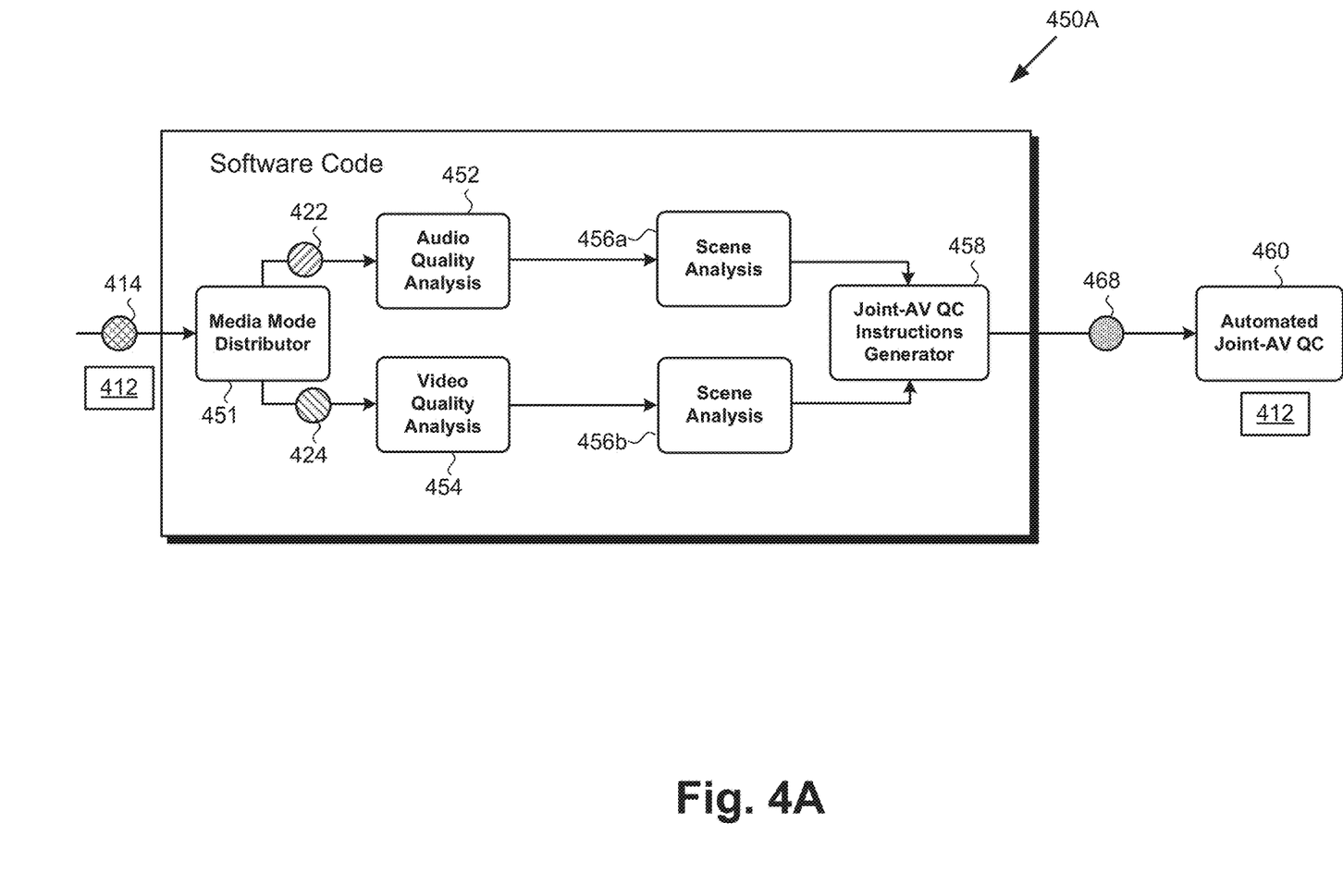
FIG. 4A shows an exemplary software code suitable for use in enabling adaptive quality control (QC) review of media content, according to one implementation.

FIG. 4A shows exemplary software code 450A suitable for use in enabling adaptive QC review of media content 412, according to one implementation. As shown in FIG. 4A, software code 450A is configured to receive automation data 414 for media content 412 as an input, and to output one or more automation instructions 468 for media content 412 (hereinafter "automation instruction(s) 468"). It is noted that media content 412, automation data 414 for media content 412, software code 450A, and automation instruction(s) 468 correspond respectively in general to media content 112/212, automation data 114/214, software code 150/250, and automation instruction(s) 168/268, in FIGS. 1 and 2. Consequently, media content 112/212, automation data 114/214, software code 150/250, and automation instruction(s) 168/268 may share any of the characteristics attributed to respective media content 412, automation data 414 for media content 412, software code 450A, and automation instruction(s) 468 by the present disclosure, and vice versa.

According to the exemplary implementation shown in FIG. 4A, media content 412 is AV content having a video mode and an audio mode. As further shown by FIG. 4A, software code 450A includes media mode distributor block 451 configured to receive encoding parameters 414 for media content 412, to distinguish one or more audio parameters 422 of media content 412 from one or more video parameters 424 of media content 412, and to distribute one or more audio parameters 422 to audio quality analysis block 452 for analysis and to distribute one or more video parameters 424 to video quality analysis block 454 for analysis. Scene analysis blocks 456a and 456b receive the outputs of respective audio quality analysis block 452 and video quality analysis block 454. Scene analysis blocks 456a and 456b process the outputs of the audio and video quality analysis blocks 452, 454 and define groups of frames or scenes, based on the MQ metrics. For example, the scene analysis blocks 456a and 456b may correlate the MQ metrics with corresponding frame ranges or time codes to define groups of frames or scenes with a single degree of VQ sensitivity. In some embodiments, the VQS levels can be defined using a multi-metric rationale, for example combining frames/segments that are associated with low VMAF or medium PSNR or low EPS, etc. Alternatively, scenes may be defined outside the system shown in FIG. 4 and sent as an input to the scene analysis blocks 456a and 456b, which then correlate the defined scenes with the relevant MQ metrics received from the audio and video quality analysis blocks 452, 454, For example, content studios that would like to assess the Video Quality of specific scenes may send data defining the scenes to be input to the scene analysis blocks 456a and 456b. Such entities may provide start/end time-codes or scene cut metadata, which the scene analysis blocks 456a and 456b could process by using a frame to scene mapping function.

The frame ranges or scene information with the relevant MQ metrics may be provided to Joint-AV QC instructions generator 458, which is configured to generate automation instruction(s) 468, using the analyses performed by audio quality analysis block 452, scene analysis block 456a, video quality analysis block 454 and scene analysis block 456b, and as described above by reference to action 330 of flowchart 300. For example, the Joint-AV QC instructions generator 458 may process the scene information and MQ metrics to generate instructions to playback scenes with MQ metrics in a certain range at a slower rate than scenes with different MQ metrics, which may be played back at a default rate. These instructions may be based on time codes or frame identifiers, or other data that identifies the portions of the video to be played back differently from a default playback mode. Depending on the particular logic of the Joint-AV QC instructions generator 458, the instructions may include, for example, instructions to a playback device to perform different playback functions such as only activating audio playback for certain scenes, or only displaying subtitles for certain frame ranges. The logic of the Joint-AV QC instructions generator 458 may also be configured to override certain data sensitivity alerts that would otherwise trigger non-default mode playback instructions. For example, where the Joint-AV QC instructions generator 458 receives data indicating that a segment has both high audio and high video sensitivity, it may discard the data and not generate an instruction other than continue default playback mode, where the Joint-AV QC instructions generator 458 would generate a slower playback instruction if either the audio or the video sensitivity were high for the segment (but not both). In another example, the Joint-AV QC instructions generator 458 may receive data from the system resulting from a comparison of an encoded video with the pre-encode source material, and where such a comparison indicates that a segment with a sensitivity in the encoded video has a corresponding segment with a sensitivity in the pre-encode source material, then this may indicate a known issue in the source material, which need not be reviewed for quality, and the Joint-AV QC instructions generator 458 will therefore discard that segment from needing an instruction other than to play that segment in the default mode.

According to the present exemplary implementation, automation instruction(s) 468 may be used by a QC technician or automated QC system to perform automated Joint-AV QC 460 according to automation instructions(s) 468. By way of example, automation instruction(s) 468 may be provided as a JavaScript Object Notation (JSON) file enumerated playback instructions such as: 1) start playback of chapter 1 at timecode hh1:mm1:ss1, apply playback speed factor 1 (PSF1) to control playback speed, enable player to switch between integer number (N1) number of video variants; 2) start playback of chapter 2 at timecode hh2:mm2:ss2, apply PSF2 to control playback speed, enable player to switch between integer number (N2) number of video variants, and so forth.

It is noted that the generation of automation instruction(s) 468 for media content 412 is performed using the analysis of one or more one or more audio parameters 422 of automation data 414 and the analysis of one or more video parameters 424 of automation data 414 in a manner analogous to that described above by reference to action 330 of flowchart 300. It is further noted that the analysis of one or more audio parameters 422 of automation data 414 and the analysis of one or more video parameters 424 of automation data 414 may advantageously be performed in parallel. i.e., contemporaneously.

Some of the benefits to performing Joint-AV QC 460 are the ability to detect or confirm multiple quality issues all at once. e.g., in parallel, and therefore advantageously reduce the time required to perform a QC review of media content 412. Another advantage of this method is that it provides contextual information on why a video stream or an audio stream would look or sound damaged or distorted when in fact is faithful to the creative intent of its producer, as discussed above. That is to say. Joint-AV QC 460 could provide some contextual information that is beneficial to the quality assessment of flagged frames and waveforms. In other words, independent or separate audio and video QC tasks would potentially not be able to resolve some of QC issues automatically detected by those independent analyses without the contextual information provided by Joint-AV QC 460.

Figure 4B:
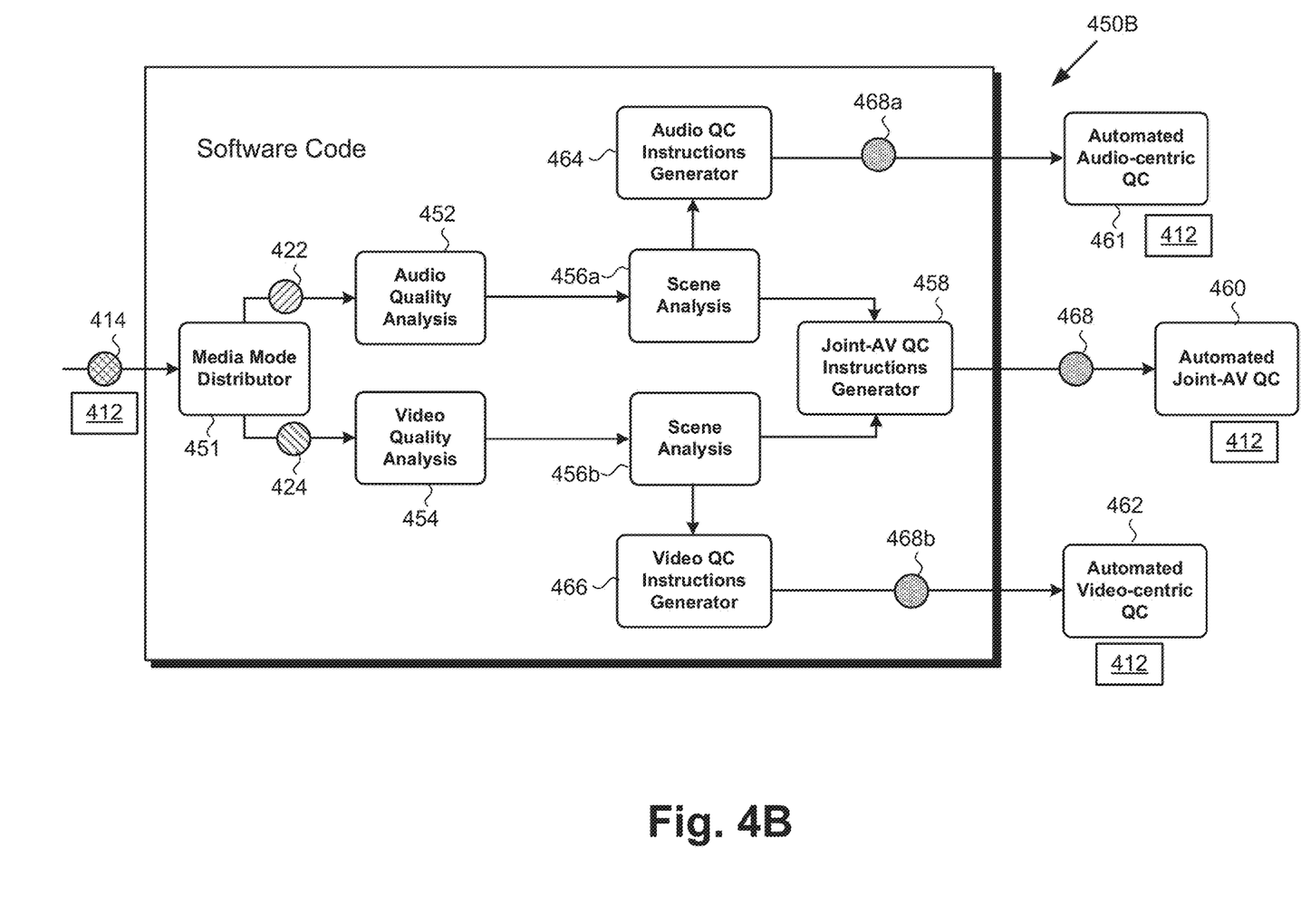
FIG. 4B shows an exemplary software code suitable for use in enabling adaptive QC review of media content, according to another implementation.

FIG. 4B shows exemplary software code 450B suitable for use in enabling adaptive QC review of media content, according to another implementation. It is noted that any features identified by reference numbers identical to those appearing in FIG. 4A correspond respectively to those features, and may share any of the characteristics attributed to them above. It is further noted that software code 450B corresponds in general to software code 150/250 in FIGS. 1 and 2, and those corresponding features may share the characteristics attributed to any one of those corresponding features by the present disclosure.

In addition to the features described above by reference to FIG. 4A, software code 450B includes Audio QC instructions generator 464 configured to generate audio-centric automation instruction(s) 468a for performing automated Audio-centric QC 461 of media content 412, and Video QC instructions generator 466 configured to generate video-centric automation instruction(s) 468b for performing automated Video-centric QC 462 of media content 412.

Like software code 450A in FIG. 4A, software code 450B may be used to generate automation instruction(s) 468 for media content 412 using the analysis of one or more audio parameters 422 of automation data 414 and the analysis of one or more video parameters 424 of automation data 414. However, in contrast to the exemplary implementation shown in FIG. 4A, software code 450B may be used to generate audio-centric automation instruction(s) 468a for media content 412 using the analysis of one or more audio parameters 422 of automation data 414 alone, or to generate video-centric automation instruction(s) 468b for media content 412 using the analysis of one or more video parameters 424 of automation data 414 alone.

The notable differences between the video and audio QC may include the following: 1) audio quality analysis relies on Audio Quality metrics (e.g., PEAQ etc.) and parameters (e.g., bit rate, loudness, and dynamics etc.) delivered by the audio encoder for every audio variant used in combination with a multi-variant video stack, 2) the scene analysis performed by scene analysis block 456b is analogous to the video scene analysis described above, but is based on an AQS map, and 3) automated Audio-centric QC 461 relies on audio-centric automation instruction(s) 468a utilizing Count of AQ-sensitive Variants (CAV), Playback Speed Factors (PSFs) per audio variant, and PSR if multi-variant audio stack is available.

According to the exemplary implementations shown in FIGS. 4A and 4B, both AQS and VQS maps may be combined to generate automated Joint-AV QC 460 that can provide automated review of both audio and video media with appropriate PSFs/PSR for a selected number of variants e.g. CCV in the multi-variant ABR, and CAV, as well as provide contextual scene information.

Figure 5A:
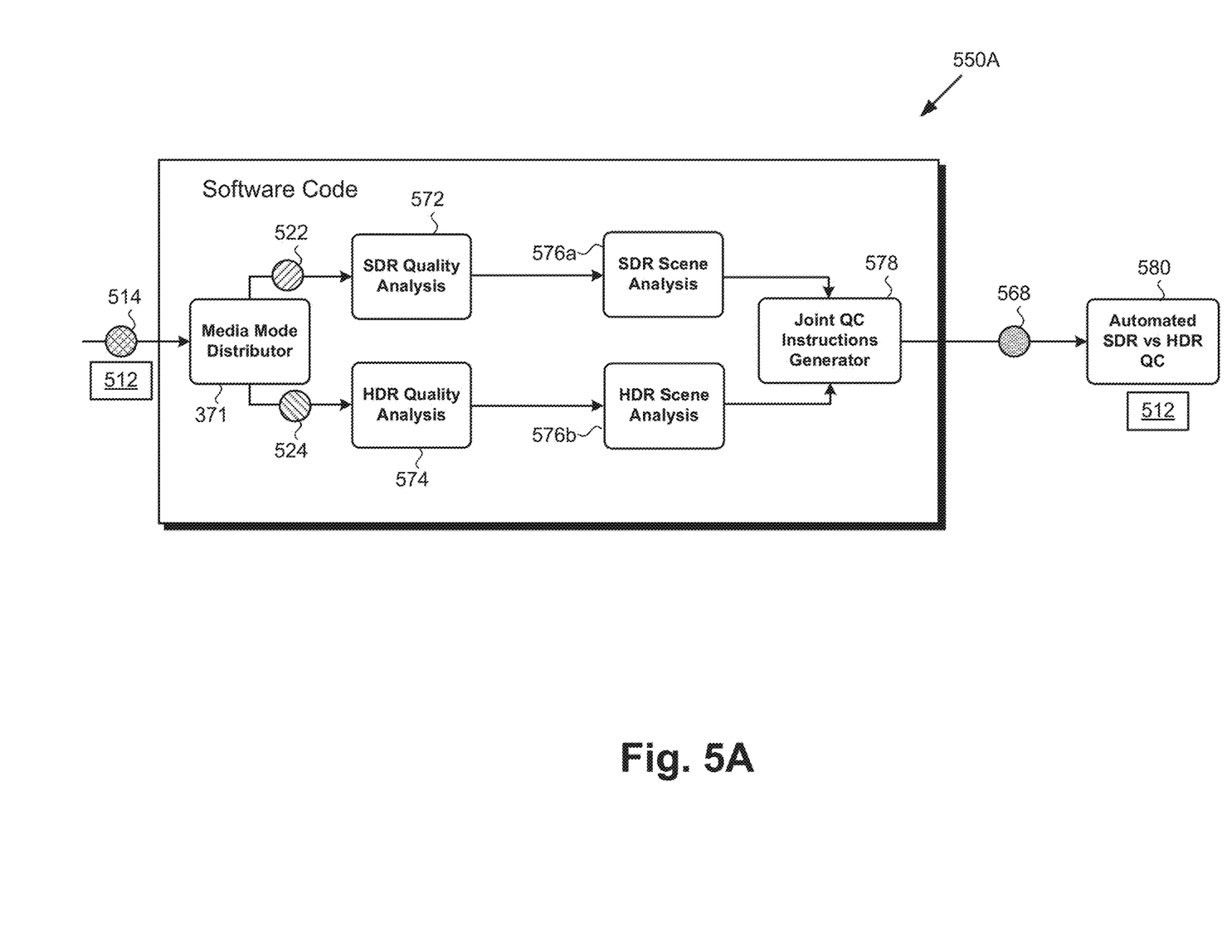
FIG. 5A shows an exemplary software code suitable for use in enabling adaptive QC review of media content, according to yet another implementation.

FIG. 5A shows exemplary software code 550A suitable for use in enabling adaptive QC review of media content 512, according to one implementation. As shown in FIG. 5A, software code 550A is configured to receive automation data 514 for media content 512 as an input, and to output one or more automation instructions 568 for media content 512 (hereinafter "automation instruction(s) 568"). It is noted that media content 512, automation data 514 for media content 512, software code 550A, and automation instruction(s) 568 correspond respectively in general to media content 112/212, automation data 114/214, software code 150/250, and automation instruction(s) 168/268, in FIGS. 1 and 2. Consequently, media content 112/212, automation data 114/214, software code 150/250, and automation instruction(s) 168/268 may share any of the characteristics attributed to respective media content 512, automation data 514 for media content 512, software code 550A, and automation instruction(s) 568 by the present disclosure, and vice versa.

According to the exemplary implementation shown in FIG. 5A, media content 512 is content having a SDR mode and an HDR mode. As further shown by FIG. 5A, software code 550A includes media mode distributor block 571 configured to receive encoding parameters 514 for media content 512, and to distribute one or more SDR parameters 522 to SDR quality analysis block 572 for analysis and to distribute one or more HDR parameters 524 to HDR quality analysis block 574 for analysis. SDR scene analysis block 576a and HDR scene analysis block 576b receive the outputs of respective SDR quality analysis block 572 and HDR quality analysis block 574, and provide scene information to Joint QC instructions generator 578, which is configured to generate automation instruction(s) 568, using the analyses performed by SDR quality analysis block 572. SDR scene analysis block 576a. HDR quality analysis block 574 and HDR scene analysis block 576b.

According to the present exemplary implementation, automation instruction(s) 568 may be used by a QC technician or automated QC system to perform automated SDR vs HDR QC 580 in which automation instruction(s) 568 include automation instructions for QC playback of the SDR encode of media content 512 and separate automation instructions for QC playback of the HDR encode of media content 512. It is noted that the generation of automation instruction(s) 568 for media content 512 is performed using the analysis of one or more one or more SDR parameters 522 of automation data 514 and the analysis of one or more HDR parameters 524 of automation data 514. It is further noted that the analysis of one or more SDR parameters 522 of automation data 514 and the analysis of one or more HDR parameters 524 of automation data 514 may advantageously be performed in parallel, i.e., contemporaneously. It is also noted that automated SDR vs HDR QC brings automated contextuality, such that QC issues of color or shadow detail or brightness can be contextually highlighted by bringing results of SDR and HDR together in the same QC review process.

Figure 5B:
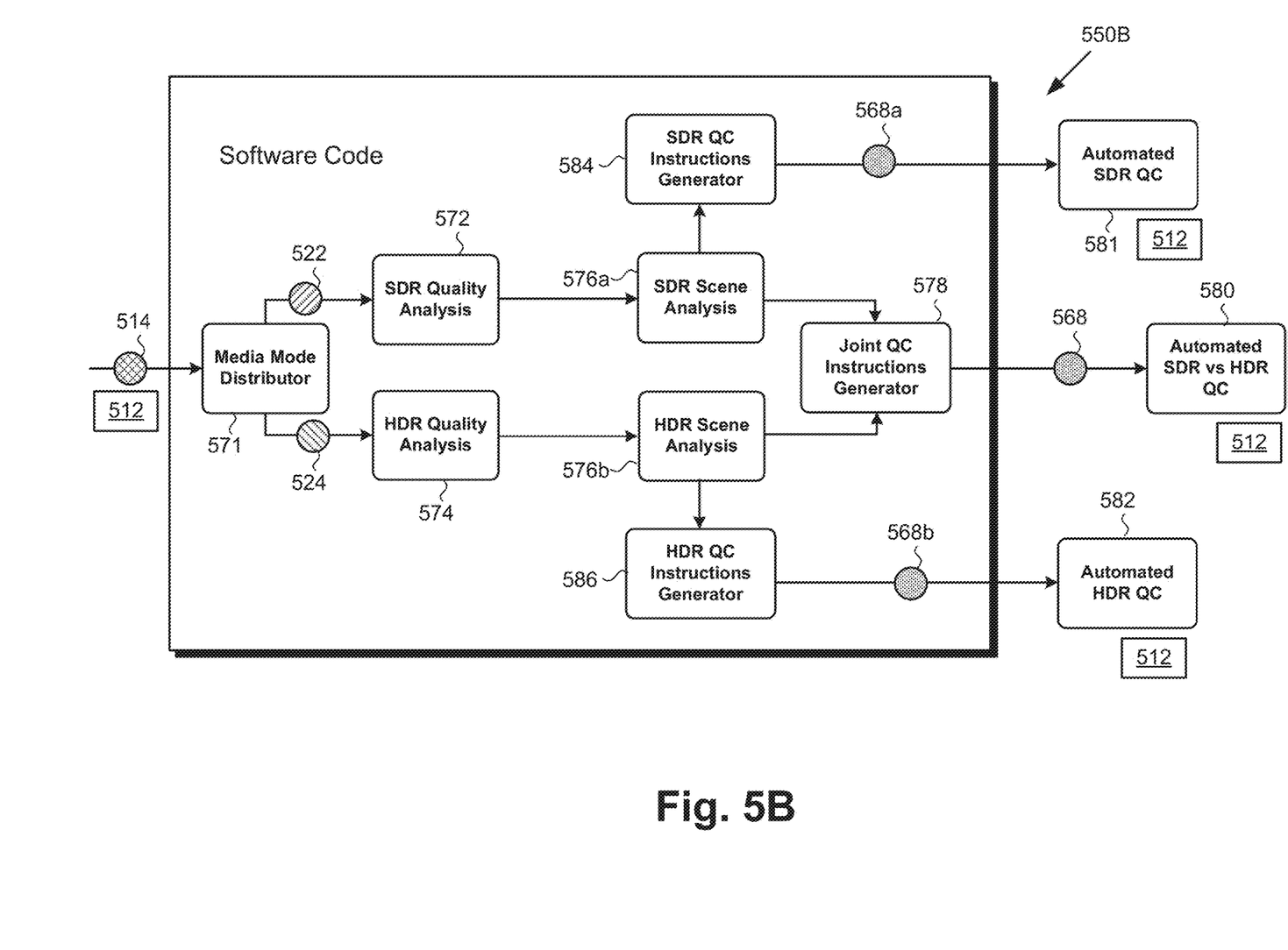
FIG. 5B shows an exemplary software code suitable for use in enabling adaptive QC review of media content, according to another implementation.

FIG. 5B shows exemplary software code 550B suitable for use in enabling adaptive QC review of media content, according to another implementation. It is noted that any features identified by reference numbers identical to those appearing in FIG. 5A correspond respectively to those features, and may share any of the characteristics attributed to them above. It is further noted that software code 550B corresponds in general to software code 150/250 in FIGS. 1 and 2, and those corresponding features may share the characteristics attributed to any one of those corresponding features by the present disclosure.

In addition to the features described above by reference to FIG. 5A, software code 550B includes SDR QC instructions generator 584 configured to generate SDR automation instruction(s) 568a for performing automated SDR QC 581 of media content 512, and HDR QC instructions generator 586 configured to generate HDR automation instruction(s) 568b for performing automated HDR QC 582 of media content 512.

Like software code 550A in FIG. 5A, software code 550B may be used to generate automation instruction(s) 568 for media content 512 using the analysis of one or more SDR parameters 522 of automation data 514 and the analysis of one or more HDR parameters 524 of automation data 514. However, in contrast to the exemplary implementation shown in FIG. 5A, software code 550B may be used to generate SDR automation instruction(s) 568a for media content 512 using the analysis of one or more SDR parameters 522 of automation data 514 alone, or to generate HDR automation instruction(s) 568b for media content 512 using the analysis of one or more HDR parameters 524 of automation data 514 alone.

It is noted that for each of the various implementations described above, the automation instructions output by the systems may be evaluated for accuracy and rated after use. Those post hoc ratings may then be advantageously used to refine and improve the various sets of MQ metrics upon which future automation instructions are to be based for different types of media content, as well as the respective algorithms defining the ways in which the optimized MQ metrics are weighted and combined in each case.

Thus, the present application discloses systems and methods for enabling automation of media content playback. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:
1. A system comprising:
a processing hardware; and
a system memory storing a software code;
the processing hardware configured to execute the software code to:
receive automation data for a media content having a default playback speed and a plurality of media modes including a first media mode and a second media mode;
analyze, using the automation data, (i) a first parameter of the media content corresponding to the first media mode, and (ii) a second parameter of the media content corresponding to the second media mode;
generate, based on analyzing, one or more automation instructions for at least one portion of the media content, wherein the one or more automation instructions comprise at least one of:
one or more bounding timestamps of the at least one portion of the media content,
one of an increased playback speed or a reduced playback speed for the at least one portion of the media content, relative to the default playback speed, or
a variable playback speed for the at least one portion of the media content; and
output the one or more automation instructions to one of a media delivery platform configured to distribute and control a quality of the media content or a media player configured to automate playback of the media content.

2. The system of claim 1, wherein the processing hardware is further configured to execute the software code to perform:
analyzing the first parameter and analyzing the second parameter in parallel.

3. The system of claim 1, wherein the one or more automation instructions comprise one or more instructions for a playback experience of the at least one portion of the media content during a quality control (QC) review of the media content.

4. The system of claim 3, wherein the one or more instructions for the playback experience of the at least one portion of the media content during the QC review of the media content include generation of at least one subtitle providing a QC review prompt.

5. The system of claim 1, wherein the media content comprises audio-video (AV) content, wherein the first media mode is a high dynamic range (HDR) version of the media content, and wherein the second media mode is a standard dynamic range (SDR) version of the media content.

6. The system of claim 1, wherein the first media mode is a video mode and the second media mode is an audio mode.

7. The system of claim 6, wherein the processing hardware is further configured to execute the software code to:
receive, from a user of the media player configured to automate playback of the media content, one or more selection inputs;
determine, using the one or more selection inputs, the first parameter corresponding to the first media mode or the second parameter corresponding to the second media mode; and
output the one or more automation instructions to the media player configured to automate playback the media content.

8. The system of claim 1, wherein the one or more automation instructions comprise one or more instructions for transmission of the at least one portion of the media content to the media player configured to automate playback of the media content, and wherein the one or more automation instructions are output to the media delivery platform configured to distribute and control the quality of the media content.

9. A method for use by a system including a processing hardware and a system memory storing a software code, the method comprising:
receiving, by the software code executed by the processing hardware, automation data for a media content having a default playback speed and a plurality of media modes including a first media mode and a second media mode;
analyzing, by the software code executed by the processing hardware and using the automation data, (i) a first parameter of the media content corresponding to the first media mode, and (ii) a second parameter of the media content corresponding to the second media mode;
generating, by the software code executed by the processing hardware based on analyzing, one or more automation instructions for at least one portion of the media content, wherein the one or more automation instructions comprise at least one of:
one or more bounding timestamps of the at least one portion of the media content,
one of an increased playback speed or a reduced playback speed for the at least one portion of the media content, relative to the default playback speed, or
a variable playback speed for the at least one portion of the media content; and
outputting, by the software code executed by the processing hardware, the one or more automation instructions to one of a media delivery platform configured to distribute and control a quality of the media content or a media player configured to automate playback of the media content.

10. The method of claim 9, wherein analyzing the first parameter and analyzing the second parameter are performed in parallel.

11. The system of claim 9, wherein the one or more automation instructions comprise one or more instructions for a playback experience of the at least one portion of the media content during a quality control (QC) review of the media content.

12. The method of claim 11, wherein the one or more instructions for the playback experience of the at least one portion of the media content during the QC review of the media content include generation of at least one subtitle providing a QC review prompt.

13. The system of claim 9, wherein the media content comprises audio-video (AV) content, wherein the first media mode is a high dynamic range (HDR) version of the media content, and wherein the second media mode is a standard dynamic range (SDR) version of the media content.

14. The system of claim 9, wherein the first media mode is a video mode and the second media mode is an audio mode.

15. The method of claim 14, further comprising:
receiving from a user of the media player configured to automate playback of the media content, by the software code executed by the processing hardware, one or more selection inputs;
determining, by the software code executed by the processing hardware and using the one or more selection inputs, the first parameter corresponding to the first media mode or the second parameter corresponding to the second media mode; and
outputting the one or more automation instructions to the media player configured to automate playback of the media content.

16. The method of claim 9, wherein the one or more automation instructions comprise one or more instructions for transmission of the at least one portion of the media content to the media player configured to automate playback of the media content, and wherein the one or more automation instructions are output to the media delivery platform configured to distribute and control the quality of the media content.

* * * * *